United States Patent
Chang et al.

(10) Patent No.: US 8,064,108 B2
(45) Date of Patent: *Nov. 22, 2011

(54) FULL-ZONE OPTICAL IMAGE ADDRESSING APPARATUS AND METHOD

(75) Inventors: Chin-Lin Chang, Hsinchu Hsien (TW); Chen-Ho Lee, Hsinchu (TW); Chen-Hsiang Shih, Chang-Hua Hsien (TW)

(73) Assignee: Transpacific Systems, LLC, Wilmington, DE (US)

( * ) Notice: Subject to any disclaimer, the term of this patent is extended or adjusted under 35 U.S.C. 154(b) by 406 days.

This patent is subject to a terminal disclaimer.

(21) Appl. No.: 11/506,441

(22) Filed: Aug. 18, 2006

(65) Prior Publication Data

US 2006/0279808 A1 Dec. 14, 2006

Related U.S. Application Data

(63) Continuation of application No. 10/065,353, filed on Oct. 8, 2002, now Pat. No. 7,136,204.

(51) Int. Cl.
*H04N 1/04* (2006.01)
(52) U.S. Cl. ........ 358/486; 358/474; 358/497; 358/471; 358/406; 358/504
(58) Field of Classification Search .................. 358/486, 358/488, 474, 497, 494, 406, 504, 505; 382/312, 382/318, 319, 271; 318/685, 696; 399/211, 399/212; 250/234–236, 216
See application file for complete search history.

(56) References Cited

U.S. PATENT DOCUMENTS

| | | | |
|---|---|---|---|
| 5,539,532 A | 7/1996 | Watanabe | |
| 5,949,922 A | 9/1999 | Wada et al. | |
| 6,178,015 B1 | 1/2001 | Lee et al. | |
| 6,229,629 B1 | 5/2001 | Tsai | |
| 6,278,808 B1 | 8/2001 | Tsai et al. | |
| 6,327,047 B1 * | 12/2001 | Motamed | 358/1.15 |
| 6,381,043 B1 | 4/2002 | Tsai et al. | |
| 6,392,762 B1 | 5/2002 | Tsai et al. | |
| 6,480,317 B2 | 11/2002 | Wu | |
| 6,639,695 B1 * | 10/2003 | Ogata | 358/474 |
| 6,707,582 B2 | 3/2004 | Chen | |
| 6,728,008 B1 | 4/2004 | Kamisuwa | |
| 6,728,011 B1 | 4/2004 | Tsai | |
| 6,961,155 B2 | 11/2005 | Sakaguchi | |

* cited by examiner

*Primary Examiner* — Cheukfan Lee
(74) *Attorney, Agent, or Firm* — Stolowitz Ford Cowger LLC

(57) ABSTRACT

A full-zone optical image addressing apparatus, including an addressing device, an image extraction converter, a comparator, an AND gate and a counter. The addressing device is located at the enclosure of the scanner and includes a plurality of geometric patterns. Each of the geometric patterns includes a plurality of rows of pixels. While receiving an exposure signal, the image extraction converter extracts one row of pixels from the addressing device, such that a series of analog signals is obtained and output to the comparator. The comparator then compares the series of analog signals to an analog critical voltage to output a series of analog comparison signals to the AND gate. The AND gate synchronously processes the series of analog comparison signals and a pixel rate clock to output the pixel data corresponding to the extracted row of pixels to the counter. After receiving the synchronously processed pixel value from the AND gate, the counter calculates and outputs the extracted row of pixels, including the amount of pixels and the geometric patterns in the row of pixels.

34 Claims, 8 Drawing Sheets

FULL-ZONE OPTICAL IMAGE ADDRESSING APPARATUS AND METHOD

CROSS-REFERENCE TO RELATED APPLICATIONS

This is a continuation patent application of U.S. patent application Ser. No. 10/065,353, filed Oct. 8, 2002, issued as U.S. Pat. No. 7,136,204.

BACKGROUND OF INVENTION

1. Field of the Invention

The invention relates in general to a full-zone optical image addressing apparatus, and more particularly, to an apparatus and a method using the addressing information of addressing patterns to perform full-zone addressing for a scanner.

2. Related Art of the Invention

In the basic structure of a typical scanner, an optical scan module (chassis) 111 and a driver structure 112 are included as shown in FIG. 1. The optical scan module 111 includes an image extraction device (not shown) to extract the image of the object to be scanned. An analog/digital converter converts the scanned image into digital data to be processed subsequently. Therefore, when the scanner starts scanning, the whole optical scan module 111 is driven by the driver structure 112, such that the image extraction device and the analog/digital converter perform image extraction and digital/analog conversion, respectively.

The driver structure 112 further comprises a driving motor and a guiding device (not shown). The driving motor includes a DC motor or stepping motor. When the DC motor is used as the driving motor for scanning, only the scanning speed is controlled to be gradually increased or gradually decreased. The address or position at certain time during the scanning process cannot be realized. As a result, the scan timing and address information for each line of the scanned document cannot be obtained. This increases the difficulty in the subsequent scanned image processing since there is no reference address to be referred for reassembling scanned lines into a complete scanned image.

The application of the stepping motor controls each scan line to be output in sequence in the subsequent image-processing step, the scanned image can be assembled in a first-in-first-out arrangement. However, such an arrangement is problematic for color scanner. Each scan line scanned by the color scanner has three sets of image information (R, G, B). Therefore, the image processes such as reassembly, compensation and correction all require address information as a reference for adjustment. Otherwise, the scanned image observed by the user may include chromatic aberration or distortion A prior art image scanning apparatus and fast addressing method have been proposed, for example, in the Taiwanese patent No. 408552. As shown in FIG. 1 in this disclosure, an object 13 to be scanned is placed on a scan platform 12. The scan platform includes an initial scan line 121, a marking pattern 14 printed by optical black, and a region 15 completed by correction white. The distance between a specific point A of the marking pattern 14 and the scan initial line 121 is referred to as predetermined length Yb. When the driver device 112 drives the image extraction device to start extracting the image, reference point coordinates c and b of the marking pattern 14 are obtained. A function of the angle between the reference point coordinates c, b and the specific point A of the marking pattern 14 is obtained. According to the predetermined length Yb, the reference point coordinates c and d, and the function of .theta., the scanner chassis can be quickly addressed in the scan initial line 121.

However, the prior art technique can only address the initial scanning position, but fails to provide the addressing technique during the scanning process. Therefore, when an external force such as vibration causes deviation of the addressing point, the image color is easily distorted.

SUMMARY OF INVENTION

The present invention provides a full-zone optical image addressing apparatus able to perform full-zone image addressing throughout the whole scanning process while using either the DC motor or the stepping motor as the driving motor. In addition, the addressing information obtained after scanning can be used as a reference for the subsequent image processing.

In one embodiment of the present invention, a full-zone optical image addressing apparatus is suitable for use in a scanner including a driving motor and a guiding device of a driver mechanism.

The above full-zone optical image addressing apparatus includes an addressing device, an image extraction converter, a comparator, an AND gate and a counter.

The addressing device is located at the enclosure of the scanner and comprises several geometric patterns. The color scales of the geometric patterns are different from the background color of the enclosure. Each of the geometric patterns comprises a plurality of rows of pixels, and the amount of pixels in each row is different depending on the moving direction of the guiding device. Upon the reception of an exposure signal, the image extraction converter extracts a row of pixels from the addressing device to obtain a series of analog signals.

The comparator coupled to the image extraction converter compares the series of analog signals with an analog critical voltage to output a series of analog comparison signals. The AND gate coupled to the comparator synchronously processes the series of analog comparison signals and a pixel rate clock to output a plurality of pixel values corresponding to the extracted row of pixels. The counter coupled to the AND gate receives the pixel values synchronously processed by the AND gate to count and output the extracted row of pixels, including the amount of pixels and the geometric pattern presented by the row of pixels.

The present invention further provides a full-zone optical image addressing apparatus suitable for use in a scanner, comprising an addressing device, an image extraction converter, a comparator, and a counter.

The addressing device is located at the enclosure of the scanner and comprises several geometric patterns. The color scales of the geometric patterns are different from the background color of the enclosure. Each of the geometric patterns comprises a plurality of rows of pixels, and the amount of pixels in each row is different depending on the scanning direction. Upon the reception of an exposure signal, the image extraction converter extracts a row of pixels from the addressing device to obtain a series of digital signals. Each of the series of digital signals corresponds to one pixel of the row of pixels.

The comparator coupled to the image extraction converter compares all the digital signals in the series of digital signals according to a digital critical value, so as to output a series of digital comparison signals. According to the series of digital comparison signals, the counter coupled to the comparator counts and outputs the extracted row of pixels, including the number of pixels and the geometric patterns presented in the extracted row of pixels.

The present invention further provides a full-zone optical image addressing apparatus applicable to a scanner. The full-zone optical image addressing apparatus comprises an addressing device, an image extraction device, a pixel row counter, an interpolation counter and a regional counter.

The addressing device is located at the enclosure of the scanner and comprises several geometric patterns. The color scales of the geometric patterns are different from the background color of the enclosure. Each of the geometric patterns comprises a plurality of rows of pixels, and the amount of pixels in each row is different depending on the scanning direction. Each of the geometric patterns has identical maximum row width and maximum length. Upon the reception of an exposure signal, the image extraction device extracts a row of pixels from the addressing device.

The pixel row counter coupled to the image extraction device counts and outputs the row number of the row of pixels extracted by the image extraction device. After receiving the row number of the row of pixels received by the image extraction device, the interpolation counter coupled to the pixel row counter performs interpolation to derive the amount of pixels in the row of pixels extracted by the image extraction device. The regional counter coupled to the pixel row counter then counts the geometric patterns existent in the row of pixels extracted by the image extraction device.

When the amount of pixels of the row of pixels extracted by the pixel row counter is equal to the maximum row width, the pixel row counter outputs an add-on signal to the regional counter to initiate counting the next zone.

In a preferred condition of the present invention, the image extraction apparatus uses the residual sensor cells to extract the row of pixels of the addressing device.

Preferably, the geometric patterns include asymmetrical patterns.

According to the above, the present invention uses residual sensor cells of the image extraction device to extract the geometric patterns in the whole scanning zone, and uses the counting devices to count the extracted geometric patterns and the amount of pixels contained in the extracted row of pixels to obtain the addressing information. From the addressing information, the positioning address of the scanned image corresponding to the extracted row of pixels is obtained.

BRIEF DESCRIPTION OF DRAWINGS

These, as well as other features of the present invention, will become more apparent upon reference to the drawings wherein.

DETAILED DESCRIPTION

Figure 1:
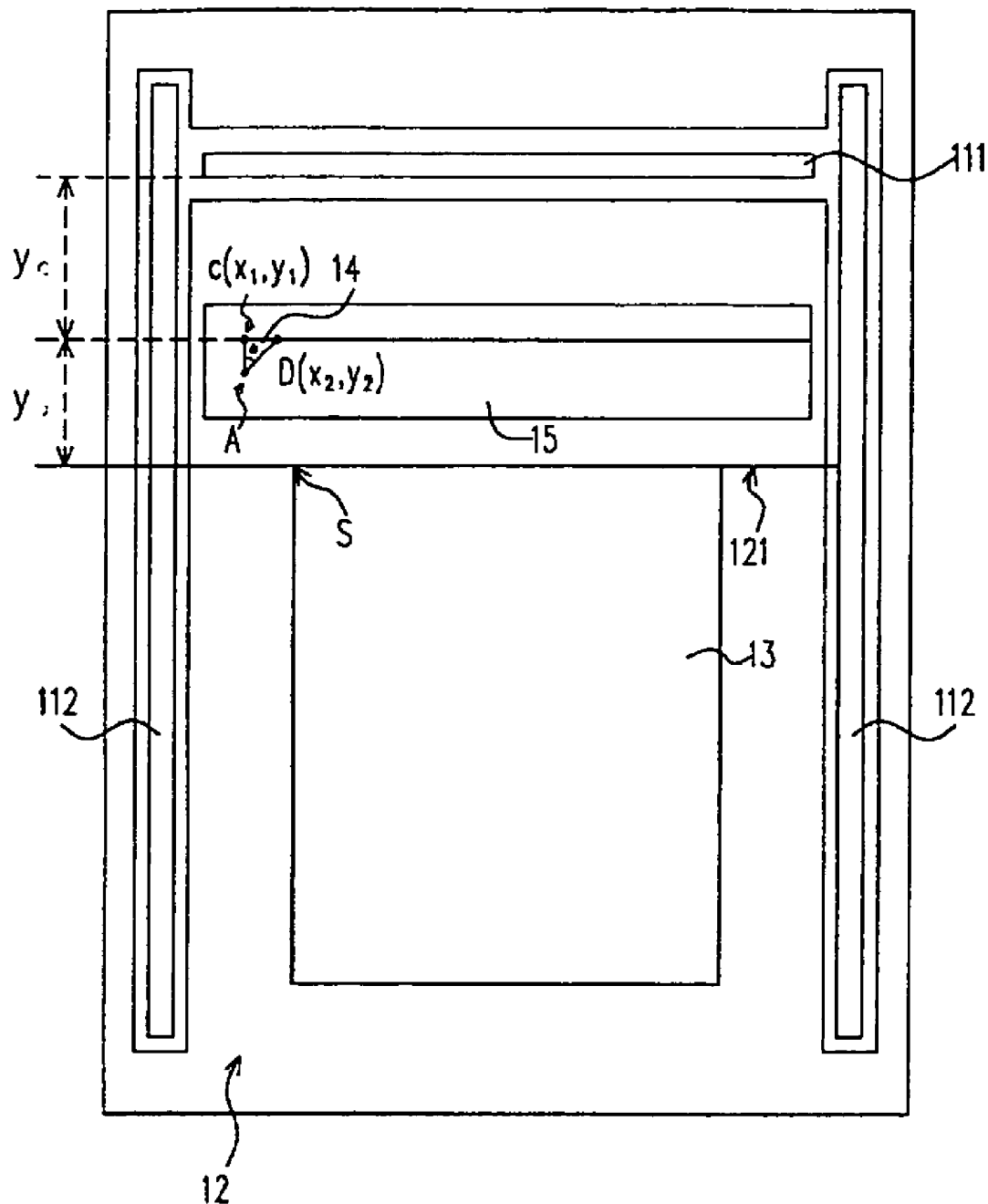
FIG. 1 shows an image scanning apparatus and a fast addressing method disclosed in the Taiwanese Patent No. 408552.
Figure 2A:
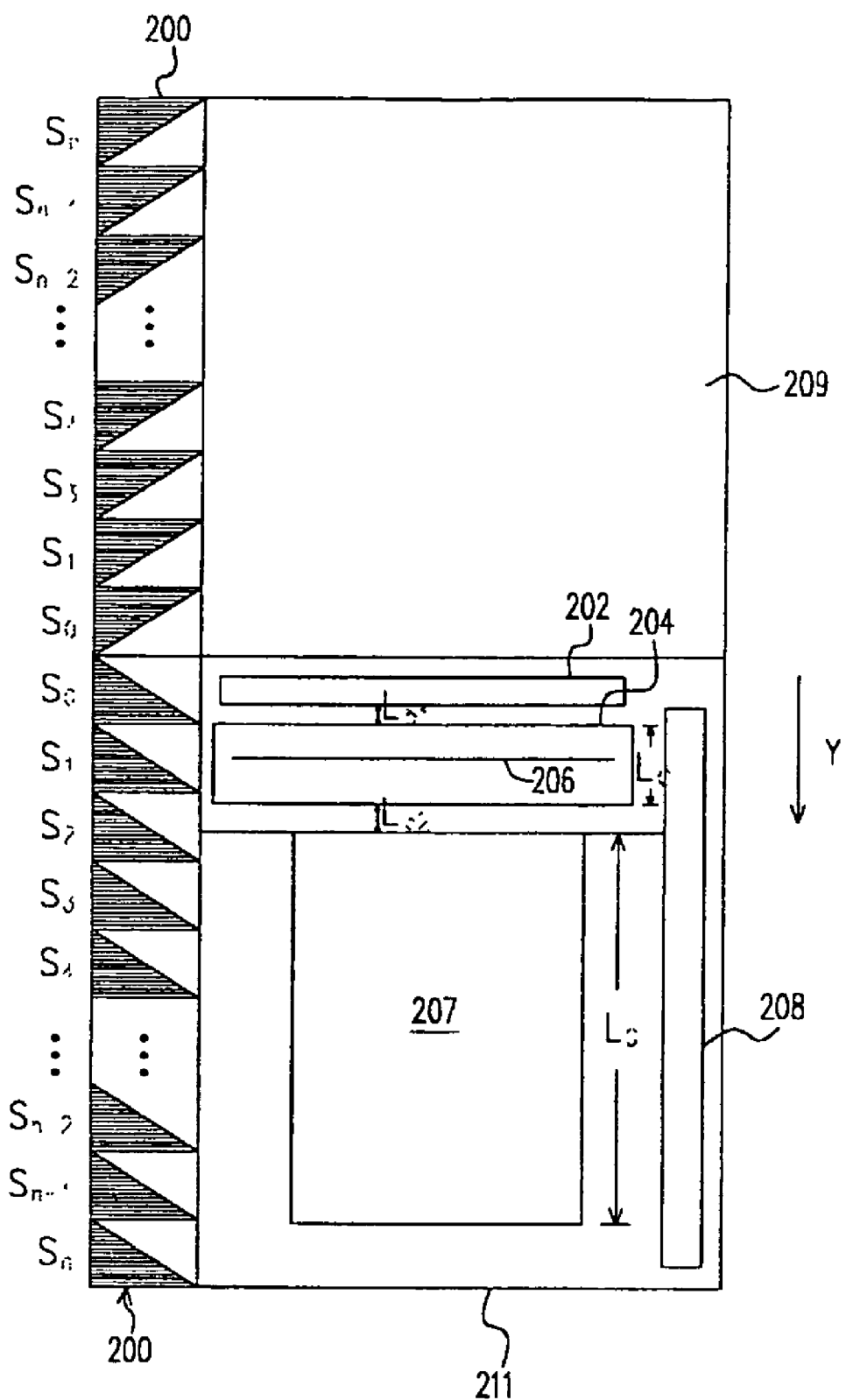
FIG. 2A shows the allocation of an addressing device of a full-zone optical image addressing apparatus according to the present invention.

Referring to FIG. 2A, a scanner having a full-zone optical image addressing apparatus according to one embodiment of the present invention is shown. The scanner comprises an optical scan module 202 and a driver mechanism 208. The driver mechanism 208 further comprises a driver motor and a guiding device. The driver motor drives the optical scan module 202 to move back and forth, while the guiding device is coupled to the optical scan module 202 and the driver motor to guide or restrain the optical scan module 202 moving along the Y-direction.

When the driver mechanism 208 is driving the optical scan module 202 moving along the Y-direction, the optical scan module 202 passes through a buffer region L $b_1$, a correction region $L_c$, and a buffer region $L_{b2}$. The correction region $L_c$ includes an optical black region 206 and a standard white region 204 as the reference for the initial black-and-white adjustment. After the initial black-and-white adjustment, the object 207 starts being scanned. During the scanning process, the image extraction device of the optical scan module 202 and other attached device extracts the corrected image in the correction region $L_c$ and the scanned image of the object 207. Therefore, the full-zone image-addressing step has to be performed for the whole scanning process, and the addressing information can be used for the subsequent image processing.

Therefore, the present invention provides a full-zone optical addressing apparatus. Referring to FIG. 2A, the allocation of an addressing device 200 is shown. The addressing device 200 is allocated on an enclosure of the scanner. In this embodiment, the addressing device 200 includes a top lid 209 and a top shell 211. The top lid 209 can be flipped over the top shell 211 for performing the scan. That is, the addressing device 200 can be mounted to either the top lid 209 or the top shell 211. In addition, the addressing device 200 can be formed integrally with the enclosure, or separately mounted to the enclosure separately. The addressing device 200 includes several identical geometric patterns (that is, the zones denoted by $S_0$ to Sn). These geometric patterns have the same size and are sequentially and continuously arranged along the enclosure. The arranging direction is parallel to the Y-direction of the guiding device. That is, the arranging direction of the geometric patterns is parallel with the scanning direction. In this embodiment, the geometric patterns are in triangle shapes. It is appreciated that the scope of the present invention is not limited thereby. Other shapes can also be applied according to specific requirements. Preferably, the geometric patterns of the addressing device 200 are asymmetrical, and the color scales of which are different from the background color of the enclosure.

Each of the geometric patterns used for addressing comprise a plurality of rows of pixels. The pitch between the rows of pixels is the same as the mechanical resolution (that is, the same as the dpi value of the stepping motor). The amount of pixels in each row of pixels is variable along the moving direction of the guiding device. Because the geometric patterns defined in the present invention include asymmetric patterns, it is expected that one end of each geometric pattern is narrower, while the other end thereof is wider. In the example of the triangular geometric pattern $S_0$, the amount of pixels in each row of pixels contained in the geometric pattern $S_0$ increases along the Y-direction when the addressing apparatus 200 is mounted to the top shell 211. When the guiding device moves opposite to the Y-direction, the amount of pixels in each row of pixels decreases. The present invention uses the amount of pixels in each row of pixels in each zone, that is, in each geometric pattern as a reference to provide the addressing information for image correction and scanned image positioning.

Figure 2B:
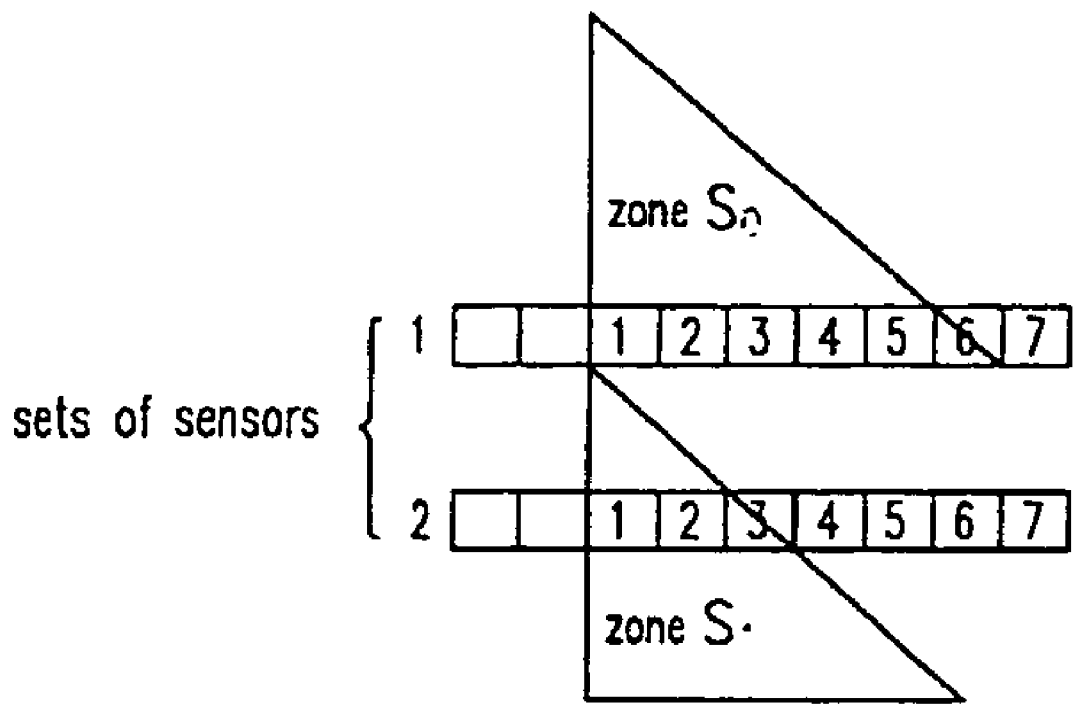
FIG. 2B schematically shows the method of obtaining the addressing information of the addressing device as shown in FIG. 2A.

As shown in FIG. 2B, the geometric patterns $S_0$ and $S_1$ as shown in FIG. 2A are defined as zone 0 and zone 1. The optical scan module 202 is driven by the driver mechanism 208 to enable the image extraction device therein to scan zone 0. The image extraction device comprises a plurality of sets of sensors, such as the set of sensors 1 and 2 in this example. When the set of sensors 1 is scanning the sixth row of pixels of zone 0, the addressing information is defined as (0,6), where 0 is the zone parameter, and 6 is the pixel parameter. The addressing information indicates the position of the corrected or scanned image is at (0,6). Meanwhile, the addressing information for the set of sensors 2 is (1,3). The sets of sensors include residual sensing cells to extract the row of pixels of the addressing apparatus. In the example of a set of sensors with resolution of 1200 dpi and a scanning of 8.5 inches, 10600 sensing cells, for example, pixels, are required to scan a document with an A4 size. The resolution of 1200 dpi comprises 8.5×1200=10200 pixels. As a result, for this particular set of sensors, 10600−10200=400 residual sensing cells are provided to extract the addressing information. Maximum row width of the geometric patterns are determined according to the residual sensing cells of the set of sensors. In this example, the row of pixels of the geometric patterns with the maximum width can be extended to contain 400 pixels.

How the generated addressing information is processed in the scanner is described as follows.

Figure 3A:
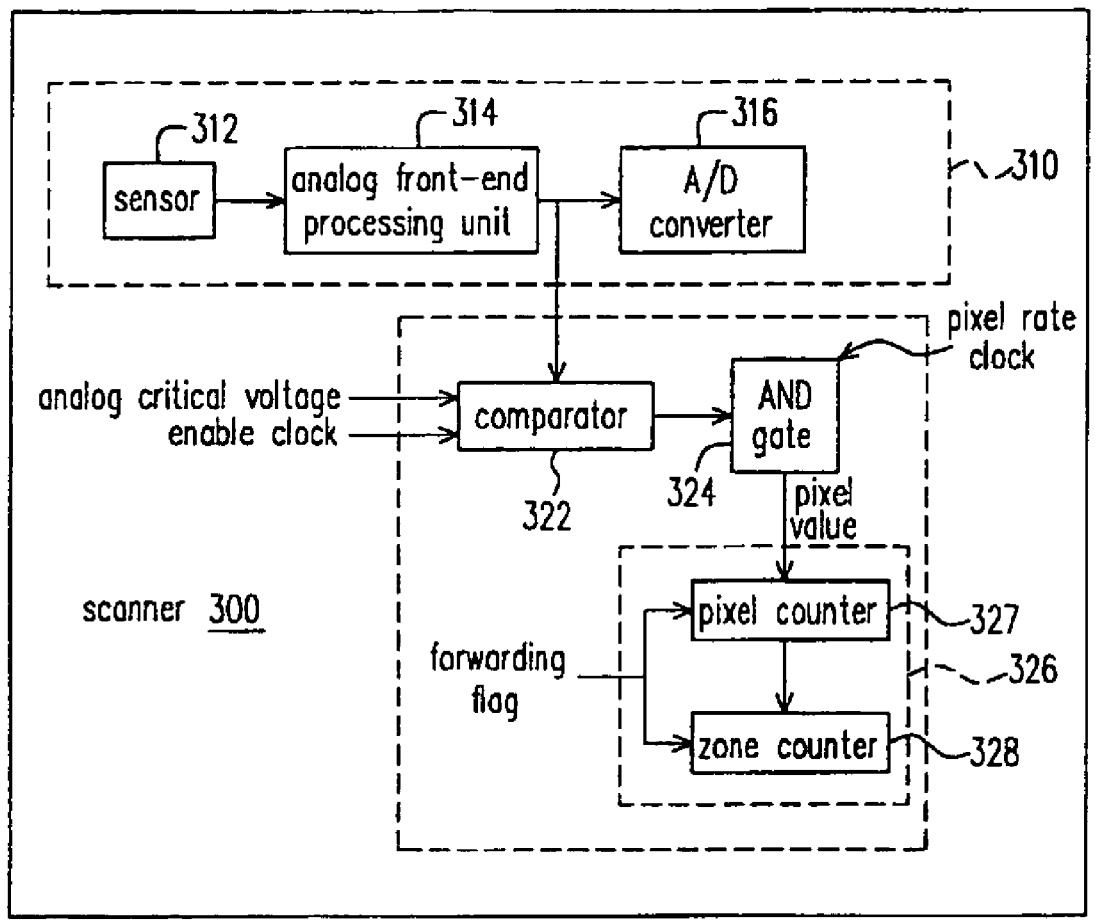
FIG. 3A shows a circuit block diagram of an addressing device in a full-zone optical image addressing device in one embodiment of the present invention.
Figure 3B:
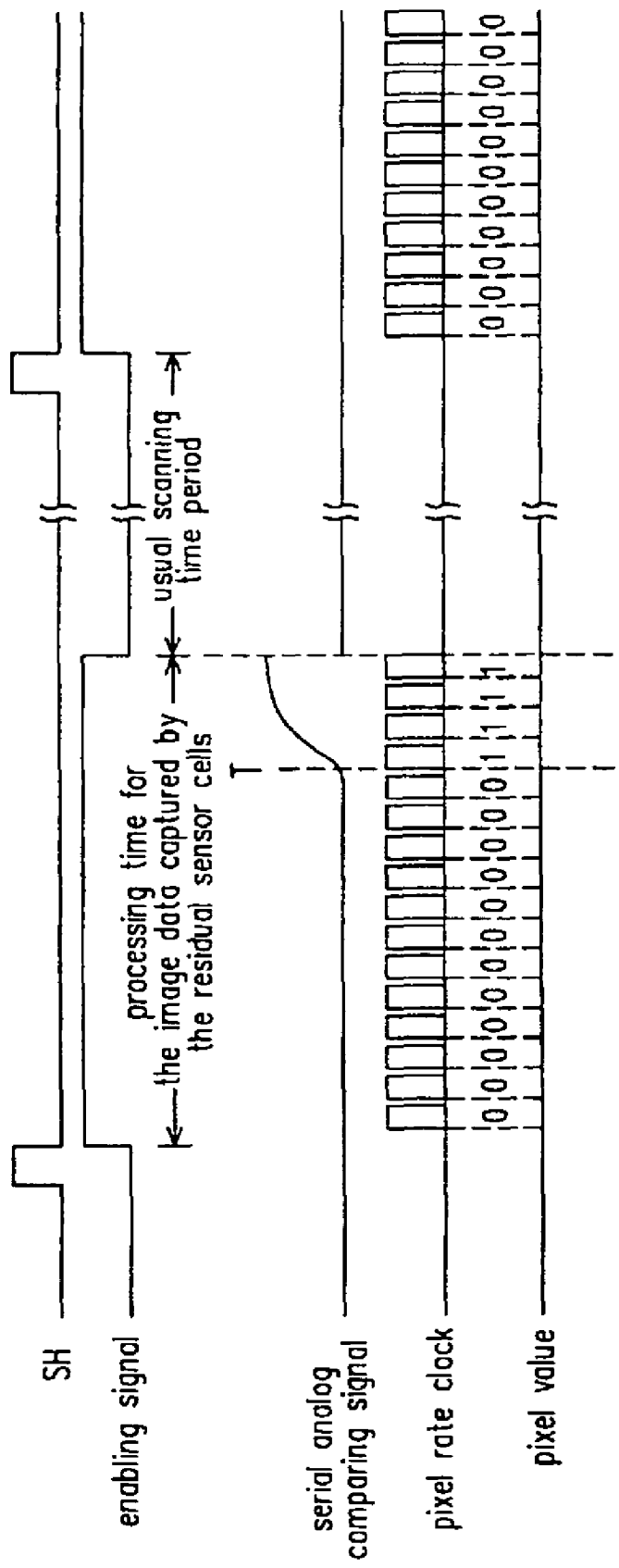
FIG. 3B shows a pulse graph obtained from the addressing information as shown in FIG. 3A.

Referring to FIGS. 3A and 3B, a full-zone optical image addressing apparatus is shown. In addition to the addressing device 200 as shown in FIG. 2A, the addressing apparatus further comprises an image extraction converter 310, a comparator 322 to obtain the addressing information, an AND gate 324, and a counter 326.

The image extraction conversion apparatus 310 is mounted on the optical scan module and further comprises a sensor 312 and an analog front-end processing unit (AFE) 314. The sensor 312 comprises at least three sensing sets to extract three primary colors R, G and B, respectively. The sensor 312 can be a charge-coupled device (CCD) or a contact image sensor (CIS). While receiving every exposure signal (that is, the signal SH as shown in FIG. 3B), each sensing set is operative to extract the addressing information corresponding to the row of pixels of the addressing device (such as the addressing device 200 as shown in FIG. 2). A series of analog signals carrying the addressing information is then obtained via the analog front-end processing unit 314. The pixel extracted by one sensor cell is transformed into an analog signal with a voltage level by the analog front-end processing unit 314.

The analog front-end processing unit 314 connected to the image extraction converter 310 receives a series of analog signals transmitted from the analog front-end processing unit 314 according to an enable signal. Further, the analog front-end processing unit 314 uses an analog critical voltage to compare the voltage level of the series of analog signals, so as to output a series of analog comparison signals.

In the example in FIG. 3B, the critical voltage is configured as 0.8 V. When the voltage level of the analog signal is smaller than 0.8 V, a logic low analog signal is output from the comparator 322. Meanwhile, the extracted pixel is a black spot. When the voltage level of the analog signal is larger than 0.8 V, a logic high analog signal is output from the comparator 322, which means a white spot is extracted from the pixel. With such a comparison condition, as shown in FIG. 3B, the pixels extracted after the enable signal and before time T of the serial analog comparison signal are all black pixels, while the pixels extracted after time T are all white pixels.

However, after obtaining the series of analog comparison signals, which analog comparison signals correspond to the extracted pixels is still unknown. As the analog signal is a smooth wave, the AND gate 324 used to distinguish the pixels corresponding to specific series of analog comparison signals is used. The AND gate 324 is coupled to the comparator 322. That is, the series of analog comparison signals and the pixel rate clock are synchronously processed to output the pixel value corresponding to the extracted row of pixels. Each pulse of the pixel rate clock indicates the extraction time for one pixel. Therefore, by the synchronous process with the pixel rate clock, the pixel value of the pixels corresponding to the series of analog comparison signals is obtained. Further, as this embodiment assumes that the pixel values corresponding to the logic low and high series of analog comparison signals are 0 and 1, respectively, one can determine whether the pixel is a black pixel or a white pixel.

The counter 326 coupled to the AND gate 324 counts the number of "0" to determine the address information where the scan line is located. The counter 326 includes the pixel counter 327 counting the pixel parameter of the address information and the zone counter 328 counting the zone parameter of the address information. The pixel counter 327 is connected to the AND gate 324 to receive the pixel value of each pixel in the row of pixels obtained from synchronous process of the AND gate 324. The number of pixels contained in the extracted row of pixels is then calculated and output. The zone counter 328 is connected to the pixel counter 327. According to the number of pixels received by the pixel counter 327, the geometric pattern where the row of pixels is located is derived.

Assuming that the black pixel represents the color scale of the geometric pattern different from the background color of the enclosure, as shown in FIG. 3B, the address information of the scan lines that have been scanned currently is located at the tenth pixel parameter in a certain zone (geometric pattern) in the addressing apparatus.

For example, assuming that the current zone counter 328 includes a value of 8, this indicates that the $8^{th}$ zone (that is, the $8^{th}$ geometric pattern) of the addressing apparatus is scanned currently. When the pixel counter 327 continues calculating the extracted row of pixels containing 8 pixels, it indicates that the currently extracted scan line is placed at the location with address information (8,8). In addition, assuming that the maximum row width, that is, the widest row of pixels, of a geometric pattern is equal to 256 pixels, an add-on signal is output when the number of pixels contained in the row of pixels is counted by the pixel counter 327. Meanwhile, the zone parameter contained in the zone counter 328 is 9, which indicates the position of the scan line extracted next is counted from the 9 zone, while the pixel parameter contained in the pixel counter 327 will be erased and subsequently counted from zero.

The counter receives a moving flag to realize the moving direction of the transmission mechanism. For example, when the flag is 0, the transmission mechanism moves along the Y-direction, while the forward flag is 1, the transmission moves opposite to the Y-direction.

Figure 4:
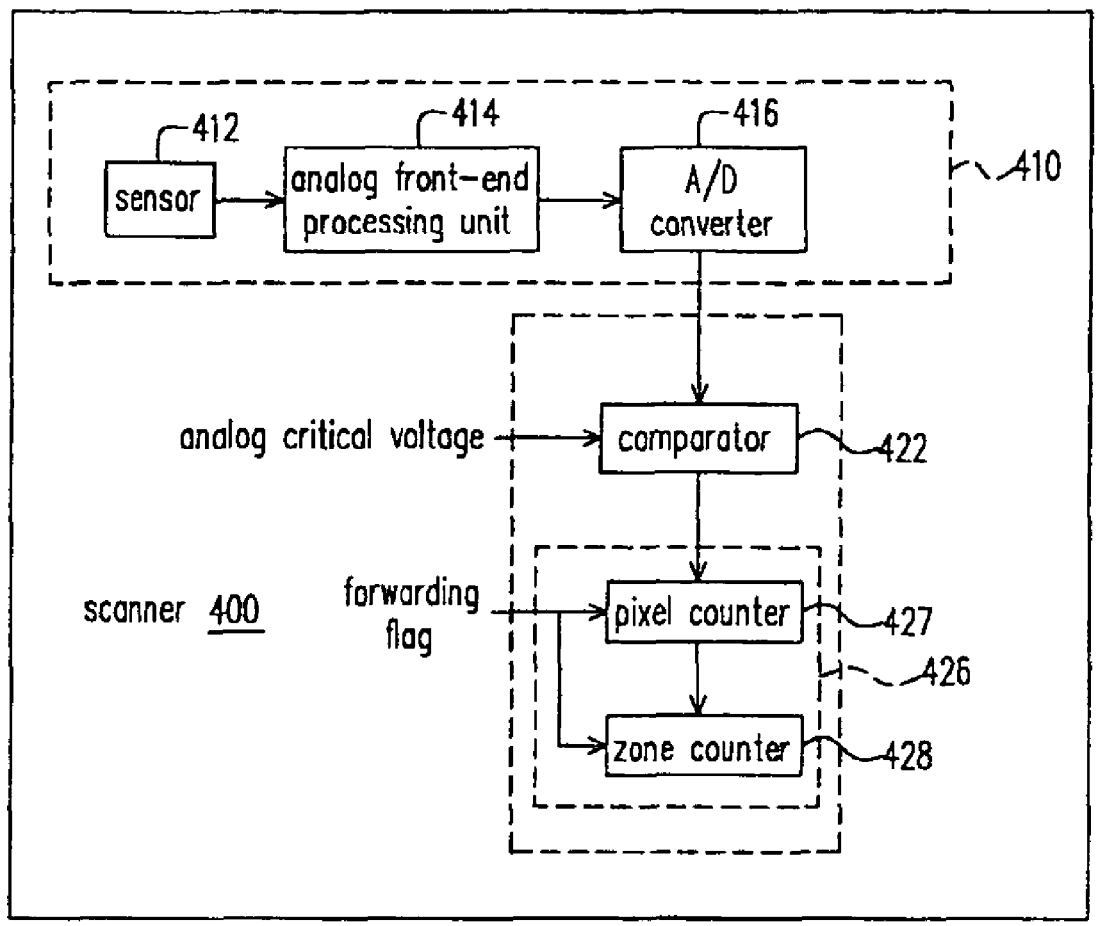
FIG. 4 is a circuit block diagram of a full-zone optical image addressing apparatus according to one embodiment of the present invention.

Referring to FIG. 4, another embodiment of a full-zone optical image addressing apparatus according to the present invention is provided. The full zone optical image addressing apparatus, applicable to a scanner, includes the addressing device 200 as shown in FIG. 2A and an image extraction converter 410 commonly used in a scanner. Further, in this embodiment, the addressing information is obtained using a comparator 422 and a counter 426.

The difference from the previous embodiment includes that the image extraction converter 410 automatically converts the row of pixels extracted by the addressing device 200 into a digital signal upon reception of an exposure signal. That is, after the analog process of the analog front-end processing unit 414, the pixels contained in the row of pixels are converted into the series of digital signals corresponding to the row of pixels by the digital/analog converter 416. Each digital signal of the series of digital signals corresponds to one pixel. The series of digital signals transmitted from the image extraction converter 410 is compared, by the comparator 422 coupled to the image extraction converter 410, to a digital critical value to output a series of digital comparison signals. From the series of digital comparison signals, whether the corresponding pixels are attributed to the geometric patterns or the enclosure background color can be determined.

An example is provided to explain the above process by assuming that the geometric pattern is composed of black pixels, and the enclosure background color is white. When the photo-detector 412 is extracting one scan line of the object to be scanned, that is, when the residual sensor cells are used to extract the black pixels of the row of pixels and a part of the white pixels of the enclosure background color corresponding to the scan line, the pixels extracted by the residual sensor cells are converted into a series of digital signals such as (0,0,0,10,10,20,30,32,255,256,256). According to the digital critical value 128 input to the comparator 422, the comparator 422 outputs the digital comparison signal of 0 when the digital signal is smaller than the digital critical value. That is, the extracted pixel is a black pixel. On the contrary, when the digital signal among the series of digital comparison signals is larger than the digital critical value, a digital comparison signal of 1 is output, and the extracted pixel is a white pixel. From the above example, the comparator 422 outputs a series of digital comparison signals of (0,0,0,0,0,0,0,0,1,1,1) to the counter 426.

The counter 426 connected to the comparator 422 counts the number of pixels contained in the row of pixels extracted from the geometric pattern and the geometric pattern where the row of pixels is located. The counter 426 includes a pixel counter 427 and a zone counter 428 connected to the pixel counter 427. The pixel counter 427 is coupled to the comparator 422 to receive the serial of digital comparison signals of (0,0,0,0,0,0,0,1,1,1) output thereby. According to the serial of digital comparison signals, the number of black pixels contained in the row of pixels extracted from the geometric zone is derived as 8 (because there are 8 0's), so that the pixel parameter of the address information is 8.

When the zone parameter contained in the zone counter 428 is 10, the address information of (10,8) is derived from the outputs of the pixel counter 427 and the zone counter 428. In addition, assuming that the number of pixels in the extracted row of pixels calculated by the pixel counter 427 reaches the maximum row width, an add-on signal is output to the zone counter 428. It indicates that the next zone (that is, the geometric pattern in the $11^{th}$ zone) is counted as the zone position of the scan line.

Figure 5:
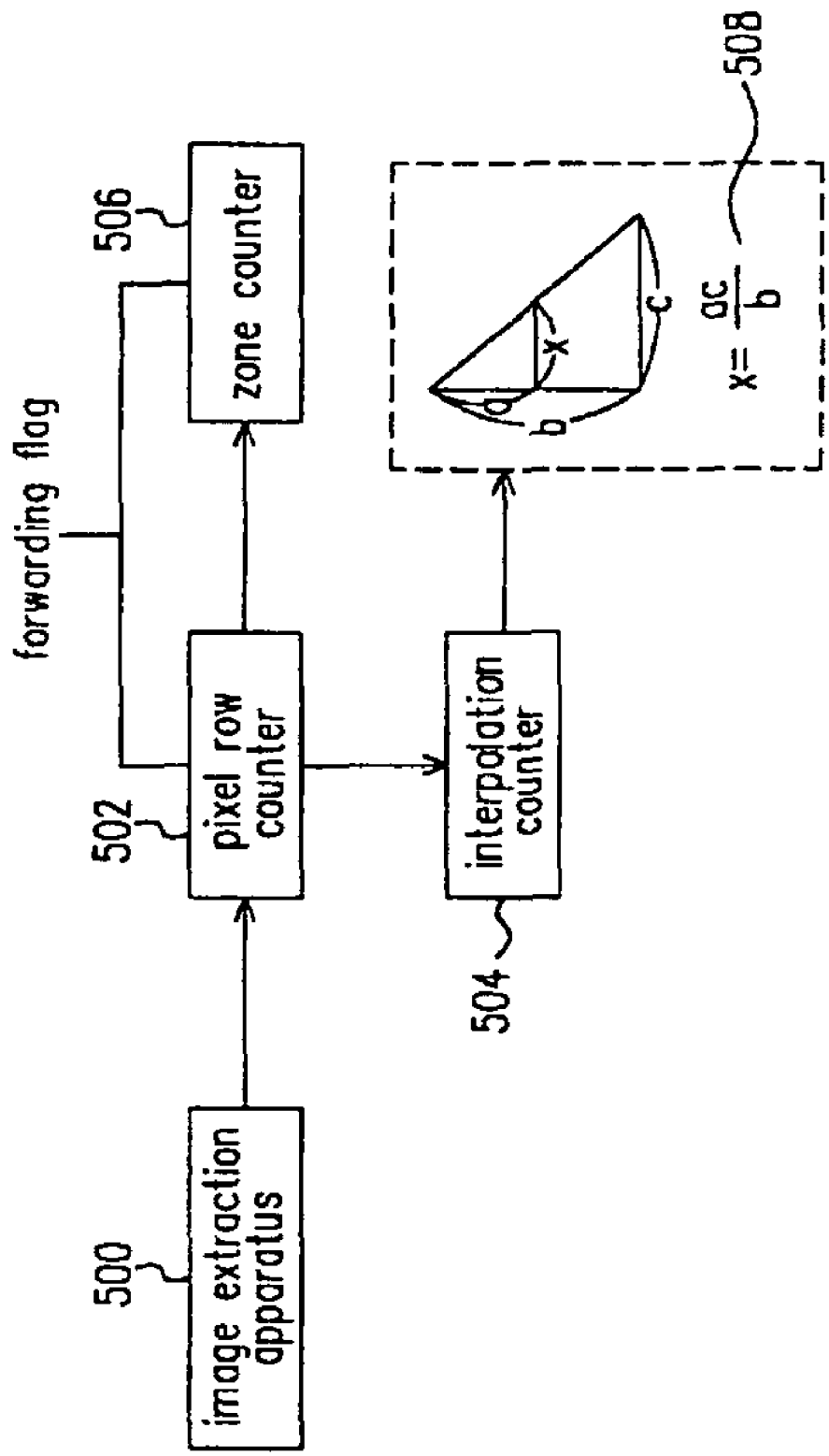
FIG. 5 shows a circuit block diagram of a full-zone optical image addressing apparatus according to one embodiment of the present invention.

Referring to FIG. 5; a full-zone optical image addressing apparatus in one embodiment of the present invention is shown. The full-zone optical image addressing apparatus comprises the addressing device 200 as shown in FIG. 2, the image extraction apparatus 500, the pixel row counter 502 coupled to the image extraction apparatus 500, an interpolation counter 504 coupled to the pixel row counter 502, and a zone counter 506 connected to the pixel row counter 502.

The addressing device 200 includes a plurality of geometric patterns disposed on the enclosure of a scanner. Each geometric pattern comprises a plurality of rows of pixels. The maximum row width and the maximum row length for each geometric pattern are the same. The maximum row width is determined according to the maximum pixels that the residual sensor cells of the image extraction apparatus 500 can extract. The maximum length depends on the maximum value that the pixel counter 502 can count.

An example for designing the maximum row width and length of the geometric patterns is introduced as follows. Assuming that the residual sensor cells of the image extraction apparatus 500 can extract a maximum value of 400 pixels, the maximum row width of the geometric patterns is a row of pixels containing 400 pixels. Based on the consideration of hardware design cost, the maximum row width is set as 8 bits or multiples of 8 bits. Under the above two conditions, the maximum row width of the geometric patterns is the row containing 256 pixels. In addition, the maximum length is designed based on the hardware design cost of the pixel row counter 502. For example, the maximum length can be configured as 8 bits or multiples of 8 bits. When the pixel row counter 502 is an 8-bit counter, the geometric patterns have a maximum length of 256 pixels. In the full-zone addressing scanner, the whole addressing length includes the buffer region, the correction region and the scan region (such as the buffer region $L_{b1}$, the correction region $L_{c1}$, the buffer region $L_{b2}$, and the scan region $L_s$ as shown in FIG. 2A). Each region is located with the corresponding geometric patterns designed according to the whole addressing length, the mechanical resolution of the scanner, and the maximum length of the geometric patterns:The amount of geometric patterns=The whole addressing length (inches)*The mechanical resolution (dpi)/the maximum length of the geometric patterns Each set of sensors in the image extraction apparatus 500 extracts the row of pixels of the addressing apparatus upon reception of an exposure signal. According to the row of pixels extracted by the image extraction apparatus 500, the row number of the row of pixels in the geometric patterns is calculated. The row number is output to the interpolator 502. According to the row number, the maximum row width, and the maximum length, the interpolation counter 504 performs interpolation 508 to obtain the number of pixels contained in the extracted row of pixels.

In the calculation process of the interpolation counter 504, the geometric patterns used for addressing include triangular asymmetric patterns, for example. When the image extraction apparatus 500 extracts a scan line from the object to be scanned, a row number value is added in the pixel row counter 502. In the example as shown in FIG. 5, when the image extraction apparatus 500 travels through a rows and reaches the point o, the addressing information of the scan line at the point o is calculated. The value a is output to the interpolation counter 504, which then performs interpolation to derive the number of pixels x contained in the row of pixels extracted by the image extraction apparatus 500 according to the value a, the maximum row width c, and the maximum length b. When x equals to the maximum row width c, an add-on signal is output from the pixel row counter 502 to the zone counter 506 for addressing the next zone.

Figure 6:
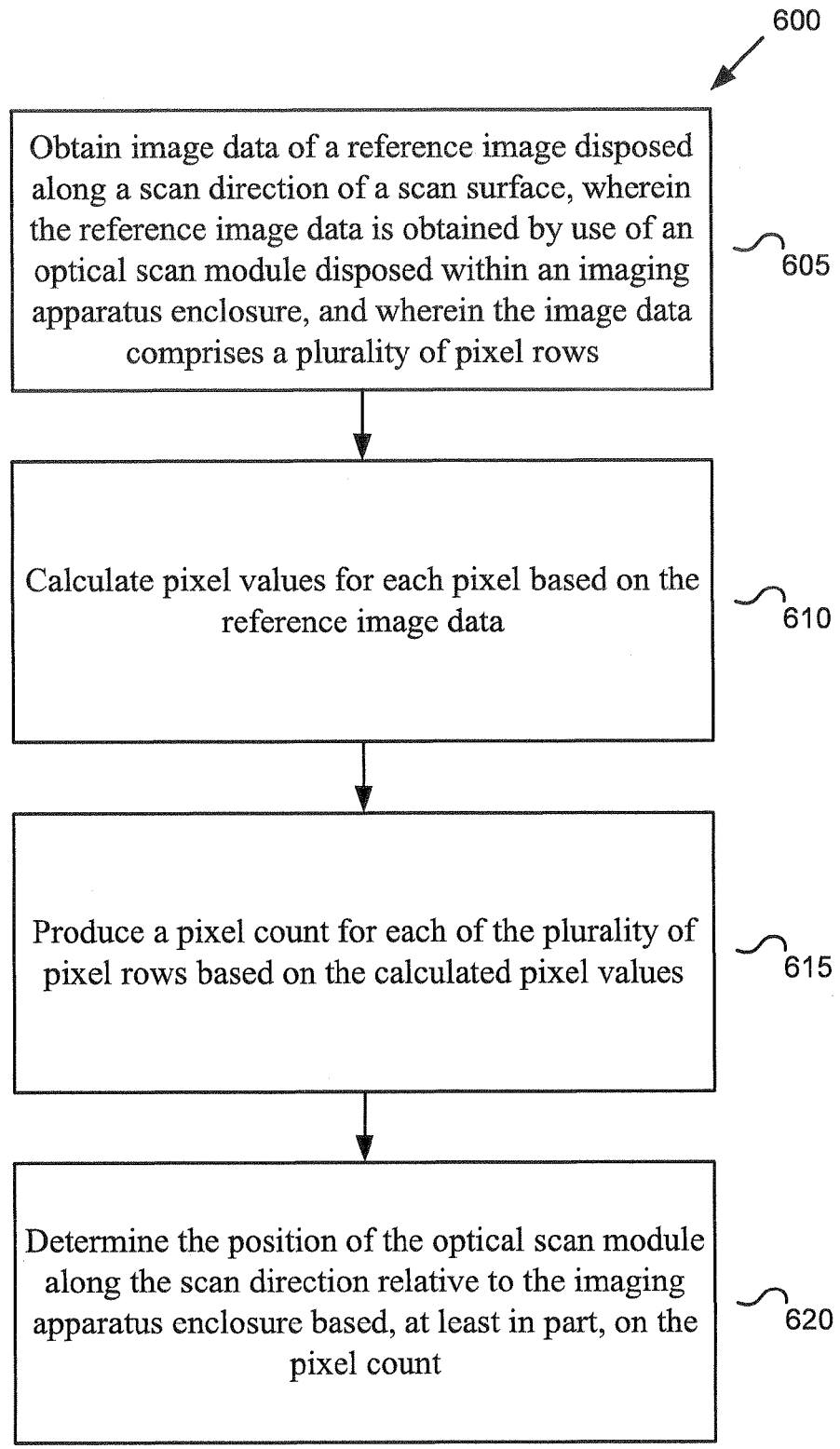
FIG. 6 shows a flow chart illustrating a method of determining the position of an optical scan module disposed within an imaging apparatus enclosure.

Referring to FIG. 6, a flow chart illustrating a method of determining the position of an optical scan module disposed within an imaging apparatus enclosure is shown. At operation 605, image data of a reference image disposed along a scan direction of a scan surface is obtained. The reference image data is obtained by use of an optical scan module disposed within an imaging apparatus enclosure. The image data comprises a plurality of pixel rows.

At operation 610, pixel values for each pixel based on the reference image data are calculated.

At operation 615, a pixel count for each of the plurality of pixel rows based on the calculated pixel values is produced.

At operation 620, the position of the optical scan module along the scan direction relative to the imaging apparatus enclosure based, at least in part, on the pixel count is determined.

According to the above, the present invention has the advantage of full-zone image addressing. In addition, the addressing information obtained during a scan can be used in the subsequent process such as image compensation, correction and assembly.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

The invention claimed is:

1. A scanner, comprising:
    an enclosure;
    an optical scan module disposed in the enclosure and configured to obtain image data;
    a driver mechanism coupled to the optical scan module and configured to move the optical scan module with respect to the enclosure;
    an image converter configured to convert the obtained image data into analog signals;
    a comparator configured to compare a voltage value with the analog signals; and
    a counter configured to determine a location of the optical scan module with respect to the enclosure based, at least in part, on the comparison.

2. The scanner of claim 1, further comprising an AND gate configured to receive a comparison signal from the comparator and to provide a plurality of pixel values to the counter.

3. The scanner of claim 2, wherein the counter comprises a pixel value counter.

4. The scanner of claim 1, further comprising a reference image on a scan surface in the enclosure, wherein image data of the reference image comprises a plurality of pixel rows, wherein each pixel row is comprised of a plurality of pixels, wherein each pixel has an associated pixel value, and wherein the counter is configured to determine a pixel row count based on a number of pixels in the pixel row having a pixel value above a threshold value.

5. The scanner of claim 4, wherein the driver mechanism has a locational resolution range in a scan direction, and wherein each pixel row of the reference image data within the locational resolution range has a unique associated pixel row count.

6. The scanner of claim 4, wherein the reference image comprises a linear pattern of a shape, wherein the shape regularly recurs at a pattern spacing, and wherein the linear pattern occurs along a scan direction on the scan surface.

7. The scanner of claim 6, wherein the shape comprises pixel rows each having a unique pixel count.

8. The scanner of claim 7, wherein the driver mechanism has a linear resolution in the scan direction that is associated with a number of pixel rows, and wherein the shape comprises more pixel rows in the scan direction than the number of pixel rows associated with the linear resolution of the driver mechanism.

9. An apparatus, comprising:
    a scanner enclosure having a scanning surface; and
    a geometric pattern disposed on the scanning surface, wherein the geometric pattern is arranged along a scanning direction of the scanning surface, and wherein the geometric pattern is configured to provide pixel count data to an optical scan module disposed in the scanner enclosure.

10. The apparatus of claim 9, wherein the geometric pattern comprises a plurality of pixel rows, and wherein each pixel row of the geometric pattern comprises a different pixel count.

11. The apparatus of claim 9, wherein the geometric pattern comprises a series of triangles.

12. A scanner, comprising:
    an enclosure having a scanning surface;
    a geometric pattern disposed on the scanning surface and arranged along a scan direction of the scanning surface, wherein the geometric pattern comprises a plurality of pixel rows, and wherein each pixel row of the geometric pattern comprises a different number of pixels;
    an optical scan module disposed in the enclosure and configured to obtain image data of the geometric pattern; and
    circuitry configured to determine a location of the optical scan module with respect to the scanning surface based, at least in part, on the obtained image data.

13. The scanner of claim 12, wherein the circuitry is further configured to count pixel rows.

14. The scanner of claim 12, wherein the optical scan module further comprises a charge-coupled device (CCD) sensor or a contact image sensor (CIS).

15. A method, comprising:
    obtaining image data of a reference image disposed along a scan direction of a scan surface, wherein the reference image data is obtained by use of an optical scan module disposed within an imaging apparatus enclosure, and wherein the reference image data comprises a plurality of pixel rows;
    calculating pixel values for each pixel based on the reference image data;
    producing a pixel count for each of the plurality of pixel rows based on the calculated pixel values; and
    determining a position of the optical scan module along the scan direction relative to the imaging apparatus enclosure based, at least in part, on the pixel count.

16. The method of claim 15, wherein determining the position of the optical scan module comprises identifying a pixel row based, at least in part, on the pixel count.

17. The method of claim 15, wherein the reference image comprises a shape, and wherein each pixel row of the shape comprises a different pixel count than other pixel rows of the shape.

18. The method of claim 17, further comprising counting a number of shapes traversed by the optical scan module during a scan to determine the position of the optical scan module.

19. The method of claim 17, wherein the shape comprises an asymmetric shape, and wherein the method further comprises:
ascertaining a direction of motion of the optical scan module relative to the imaging apparatus enclosure by using pixel counts associated with the asymmetric shape.

20. The method of claim 15, further comprising scanning a document concurrently with obtaining the reference image data.

21. An apparatus, comprising:
means for obtaining image data of a reference image disposed along a scan direction of a scan surface by use of an optical scan module disposed within an imaging apparatus enclosure, wherein the reference image data comprises a plurality of pixel rows;
means for calculating pixel values based, at least in part, on the reference image data;
means for producing a pixel count for each of the plurality of pixel rows based, at least in part, on the calculated pixel values; and
means for determining a position of the optical scan module along the scan direction relative to the imaging apparatus enclosure based, at least in part, on the pixel count.

22. The apparatus of claim 21, further comprising:
means for comparing the pixel count with a stored pixel count of a stored image.

23. The apparatus of claim 21, wherein the reference image comprises a pattern of a geometrical shape having a pattern spacing, and wherein each pixel row within the geometrical shape comprises a different pixel count than other pixel rows within the geometrical shape.

24. The apparatus of claim 23, wherein the means for determining comprises means for determining the position of the optical scan module by counting a number of the geometric shapes traversed by the scan module during a scan.

25. The apparatus of claim 23, wherein the geometrical shape comprises an asymmetric shape, and wherein the apparatus further comprises:
means for ascertaining whether a direction of motion of the scan module relative to the imaging apparatus enclosure is in a forward scan direction or a reverse scan direction by using pixel counts associated with the asymmetric shape.

26. An apparatus comprising:
an enclosure;
a scan surface located within the enclosure;
a scan module configured to scan the scan surface by obtaining scan lines of image data while translating relative to the scan surface in a scan direction, wherein the scan module is disposed within the enclosure;
a reference image located on the scan surface along an edge of the scan surface, wherein the reference image is oriented along the scan direction to determine a location of the scan module relative to the scan surface along the scan direction; and
circuitry configured to:
provide a comparison of the image data with a critical value; and
determine the location of the scan module relative to the scan surface along the scan direction, wherein the location is determined based on the comparison of the image data with the critical value.

27. The apparatus of claim 26, wherein the reference image comprises a pattern of asymmetric shapes, and wherein a period of the pattern along the scan direction is greater than an inherent linear resolution of a drive mechanism along the scan direction.

28. The apparatus of claim 27, wherein the drive mechanism is coupled to the scan module.

29. The apparatus of claim 26, wherein the scan module further comprises a charge-coupled device (CCD) or a contact image sensor (CIS).

30. The apparatus of claim 26, wherein the reference image comprises a plurality of pixel rows, and wherein each pixel row comprises pixel data different than the pixel data in adjacent pixel rows.

31. The apparatus of claim 26, wherein the reference image comprises a color image, and wherein the scan module comprises:
a sensor for red light configured to obtain a red portion of the color image;
a sensor for green light configured to obtain a green portion of the color image; and
a sensor for blue light configured to obtain a blue portion of the color image, wherein the circuitry is further configured to register the red portion of the color image, the green portion of the color image, and the blue portion of the color image to form a composite color image, and wherein the registering is determined based on a comparison of the scanned red, green, and blue image data of the color image with the critical value.

32. The apparatus of claim 26, wherein the circuitry is further configured to:
compare pixel voltages to a critical voltage to determine if a pixel is within a geometric shape of the reference image;
count a number of pixels of a scan line that are within the geometric shape of the reference image; and
identify a row associated with the scan line based, at least in part, on the number of pixels.

33. The apparatus of claim 32, wherein the circuitry is further configured to:
count a number of pixel rows of the reference image; and
count a number of geometric shapes in the reference image.

34. The apparatus of claim 26, wherein the scan module is further configured to scan both the reference image and a document concurrently, and wherein the document is located upon the scan surface.

* * * * *